(12) United States Patent
Jang et al.

(10) Patent No.: US 11,745,139 B2
(45) Date of Patent: Sep. 5, 2023

(54) DESICCANT REPLACING APPARATUS AND AIR DRY SYSTEM INCLUDING THE SAME

(71) Applicant: Samsung Electronics Co., Ltd., Suwon-si (KR)

(72) Inventors: Sungmin Jang, Suwon-si (KR); Tae-Hyun Ko, Hwaseong-si (KR); Dong-Hee Kim, Gimhae-si (KR); Taehyun Kim, Asan-si (KR); Jiwoon Lee, Incheon (KR); Haeyong Choi, Yongin-si (KR)

(73) Assignee: Samsung Electronics Co., Ltd.

( * ) Notice: Subject to any disclaimer, the term of this patent is extended or adjusted under 35 U.S.C. 154(b) by 358 days.

(21) Appl. No.: 17/306,352

(22) Filed: May 3, 2021

(65) Prior Publication Data
US 2022/0111331 A1    Apr. 14, 2022

(30) Foreign Application Priority Data

Oct. 13, 2020  (KR) .................. 10-2020-0131711

(51) Int. Cl.
| | | |
|---|---|---|
| *B01D 53/26* | (2006.01) | |
| *B01D 53/047* | (2006.01) | |
| *B01D 46/71* | (2022.01) | |
| *B01D 53/04* | (2006.01) | |

(52) U.S. Cl.
CPC .......... *B01D 53/261* (2013.01); *B01D 46/71* (2022.01); *B01D 53/047* (2013.01); *B01D 53/0407* (2013.01); *B01D 2257/80* (2013.01); *B01D 2259/40013* (2013.01); *B01D 2259/40084* (2013.01)

(58) Field of Classification Search
CPC ....... B01D 46/00; B01D 53/047; B01D 53/26
See application file for complete search history.

(56) References Cited

U.S. PATENT DOCUMENTS

| | | | |
|---|---|---|---|
| 4,753,353 A | 6/1988 | Kramer | |
| 5,457,897 A | 10/1995 | Becker | |
| 6,325,572 B1 | 12/2001 | Dietrich | |
| 7,234,493 B2 | 6/2007 | Dietrich | |
| 9,604,793 B2 | 3/2017 | Maguire et al. | |
| 2011/0009590 A1 | 1/2011 | Matsumoto et al. | |

FOREIGN PATENT DOCUMENTS

| | | |
|---|---|---|
| JP | 2005028617 A | 2/2005 |
| JP | 5710966 B2 | 3/2015 |
| KR | 100821986 B1 | 4/2008 |
| KR | 101019353 B1 | 3/2011 |
| KR | 20200000671 A | 1/2020 |

*Primary Examiner* — Sharon Pregler
(74) *Attorney, Agent, or Firm* — Myers Bigel, P.A.

(57) ABSTRACT

A desiccant replacing apparatus may include a supply-discharge member, a supply connection line connected to the supply-discharge member, an air conveyor coupled to the supply connection line, a discharge connection line connected to the supply-discharge member, and an air amplifier coupled to the discharge connection line. The supply-discharge member may include a housing providing an internal space, an injection line providing an injection path and penetrating the housing, an exhaust line providing an exhaust path connected to the internal space, and a filter in the internal space or the exhaust path. The supply connection line may be connected to the injection line, and the discharge connection line may be connected to the exhaust line.

20 Claims, 12 Drawing Sheets

DESICCANT REPLACING APPARATUS AND AIR DRY SYSTEM INCLUDING THE SAME

CROSS-REFERENCE TO RELATED APPLICATIONS

This U.S. non-provisional patent application claims priority under 35 U.S.C. § 119 to Korean Patent Application No. 10-2020-0131711, filed on Oct. 13, 2020, in the Korean Intellectual Property Office, the entire contents of which are hereby incorporated by reference.

BACKGROUND

The present disclosure relates to a desiccant replacing apparatus and an air dry system including the same, and in particular, to a desiccant replacing apparatus, which is configured to automatically replace a desiccant, and an air dry system including the same.

A process of fabricating a semiconductor device includes various processes. For example, the semiconductor device may be fabricated through etching, deposition, lithography, and test processes. For some of the processes, it may be necessary to supply a gas to a process chamber. For example, air may be supplied into a chamber, which is used to fabricate the semiconductor device. In certain cases, the air supplied into the chamber should have low humidity. A system of dehumidifying the air supplied into the chamber is used for such cases. The dehumidifying system may be configured to pass the air through a tank filled with a desiccant.

SUMMARY

An embodiment of the inventive concept provides a desiccant replacing apparatus, which is configured to automatically replace a desiccant, and an air dry system including the same.

An embodiment of the inventive concept provides a desiccant replacing apparatus, which can replace the desiccant even when additional power is not provided, and an air dry system including the same.

An embodiment of the inventive concept provides a desiccant replacing apparatus, which can not only replace the desiccant but also remove dust, and an air dry system including the same.

According to an embodiment of the inventive concept, a desiccant replacing apparatus may include a supply-discharge member, a supply connection line connected to the supply-discharge member, an air conveyor coupled to the supply connection line, a discharge connection line connected to the supply-discharge member, and an air amplifier coupled to the discharge connection line. The supply-discharge member may include a housing providing an internal space, an injection line providing an injection path and extending through the housing, an exhaust line providing an exhaust path fluidly connected to the internal space, and a filter in the internal space or the exhaust path. The supply connection line may be connected to the injection line, and the discharge connection line may be connected to the exhaust line.

According to an embodiment of the inventive concept, an air dry system may include a desiccant tank providing a desiccant space, a desiccant replacing apparatus connected to the desiccant tank, an air connection line coupled to the desiccant tank, an air exhaust line coupled to the desiccant tank, and a compressor connected to the air connection line. The desiccant tank may include an air injection part, to which the air connection line is coupled, an air exhausting part, to which the air exhaust line is coupled, a desiccant injection part, to which the desiccant replacing apparatus is coupled, and a desiccant exhausting part configured to exhaust a desiccant. The desiccant replacing apparatus may include a supply-discharge member, a supply connection line connected to the supply-discharge member, an air conveyor coupled to the supply connection line, a discharge connection line connected to the supply-discharge member, and an air amplifier coupled to the discharge connection line. The supply-discharge member may include a housing providing an internal space, an injection line providing an injection path and extending through the housing in a first direction, an exhaust line extending in a second direction crossing or different than the first direction and providing an exhaust path fluidly connected to the internal space, and a filter in the internal space. The housing may be coupled to the desiccant injection part, the supply connection line may be connected to the injection line, and the discharge connection line may be connected to the exhaust line.

According to an embodiment of the inventive concept, an air dry system may include a desiccant tank providing a desiccant space, a desiccant replacing apparatus connected to the desiccant tank, an air connection line coupled to the desiccant tank, an air exhaust line coupled to the desiccant tank, and a compressor connected to the air connection line. The desiccant tank may include an air injection part, to which the air connection line is coupled, and an air exhaust part, to which the air exhaust line is coupled. The desiccant replacing apparatus may include a supply-discharge member, a supply connection line connected to the supply-discharge member, an air conveyor coupled to the supply connection line, a discharge connection line connected to the supply-discharge member, and an air amplifier coupled to the discharge connection line. The supply-discharge member may include a housing providing an internal space, an injection line providing an injection path and penetrating the housing, an exhaust line providing an exhaust path connected to the internal space, and a filter in the internal space or the exhaust path. The supply connection line may be connected to the injection line, and the discharge connection line may be connected to the exhaust line.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Example embodiments of the inventive concept will now be described more fully with reference to the accompanying drawings, in which example embodiments are shown.

Figure 1:
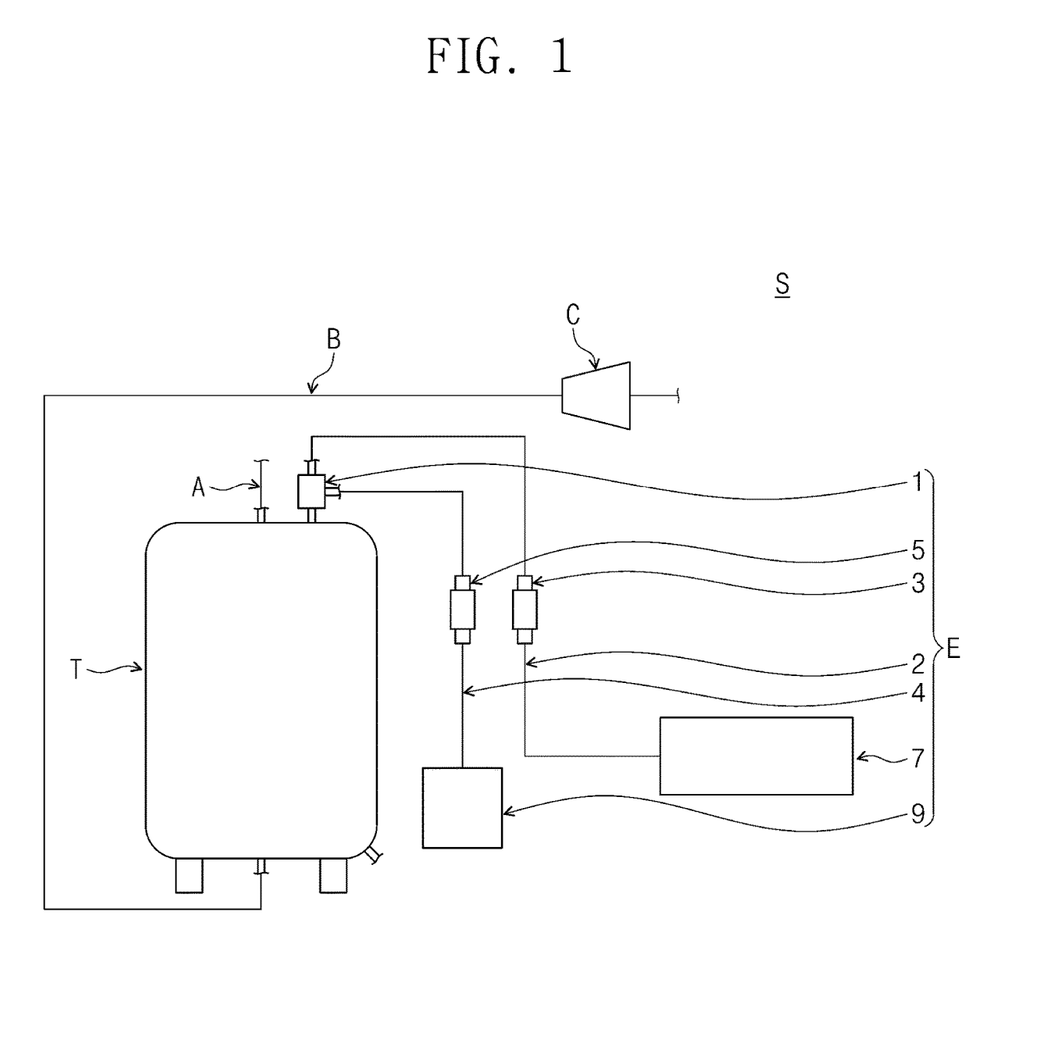
FIG. 1 is a schematic diagram illustrating a desiccant replacing apparatus according to an embodiment of the inventive concept and an air dry system including the same.

FIG. 1 is a schematic diagram illustrating a desiccant replacing apparatus according to an embodiment of the inventive concept and an air dry system including the same.

Referring to FIG. 1, an air dry system or air drying system S may be provided. The air dry system S may be configured to lower humidity of the air. In detail, the air dry system S may be configured to remove moisture from the air to thereby lower the humidity of the air, which is used in a semiconductor fabrication process. The air dry system S may include a desiccant tank T, an air connection line B, an air exhaust line A, a desiccant replacing apparatus E, and a compressor C.

The desiccant tank T may be configured to remove moisture from the air. A desiccant may be placed in the desiccant tank T. The humidity of the air may be lowered while the air passes through the desiccant tank T. In detail, when the air passes through the desiccant tank T, moisture in the air may be removed by the desiccant in the desiccant tank T and thus, the humidity of the air may be lowered. The desiccant tank T will be described in more detail with reference to FIG. 2.

The air connection line B may be connected to the desiccant tank T. The air connection line B may serve as an air-flow path. Air passing through the air connection line B may have relatively high humidity. The air passing through the air connection line B may be supplied into the desiccant tank T. The air connection line B may be connected to the compressor C. The air passing through the air connection line B may be accelerated by the compressor C.

The air exhaust line A may be connected to the desiccant tank T. The air exhaust line A may serve as an air-flow path. Air discharged from the desiccant tank T may pass through the air exhaust line A. That is, the air may be supplied into the desiccant tank T through the air connection line B and may be discharged from the desiccant tank T through the air exhaust line A. Humidity of the air may be lowered while the air passes through the desiccant tank T. Thus, the air passing through the air exhaust line A may have relatively low humidity. In other words, the air passing through the air exhaust line A may be a dry air. The air in the air exhaust line A may be supplied into a fabrication system, in which a semiconductor fabrication process is performed.

The desiccant replacing apparatus E may be connected to the desiccant tank T. For example, the desiccant replacing apparatus E may be selectively connected to the desiccant tank T. In detail, the desiccant replacing apparatus E may be connected to or disconnected from the desiccant tank T, if necessary. The desiccant replacing apparatus E may include a supply-discharge member 1, a supply connection line 2, an air conveyor 3, a discharge connection line 4, an air amplifier 5, a desiccant supplying part or desiccant supply 7, and a dust collector 9.

The supply-discharge member 1 may be connected to the desiccant tank T. The desiccant replacing apparatus E may be connected to the desiccant tank T through the supply-discharge member 1. The supply-discharge member 1 may be coupled to the desiccant tank T in a detachable manner. This will be described in more detail below.

The supply connection line 2 may be connected to the supply-discharge member 1. In an embodiment, the supply connection line 2 may be used to send the air and the desiccant to the supply-discharge member 1.

The air conveyor 3 may be coupled to the supply connection line 2. The air conveyor 3 may be connected to the compressor C. In detail, the air conveyor 3 may be selectively connected to the compressor C. The compressor C may be configured to exert a high pressure gas on the air conveyor 3. The air in the supply connection line 2 may be accelerated by the air conveyor 3. For example, the air conveyor 3 may accelerate the air in the supply connection line 2 using the high pressure gas supplied from the compressor C. The air conveyor 3 may accelerate the air in the supply connection line 2 by the Coandă effect using the high pressure gas supplied from the compressor C. Due to the acceleration by the air conveyor 3, the air may move in the supply connection line 2. Accordingly, the desiccant may also move in the supply connection line 2. This will be described in more detail below.

The discharge connection line 4 may be connected to the supply-discharge member 1. The discharge connection line 4 may be used to discharge the air, dust, and so forth, which are exhausted from the supply-discharge member 1, to the outside.

The air amplifier 5 may be coupled to the discharge connection line 4. The air amplifier 5 may be connected to the compressor C. In detail, the air amplifier 5 may be selectively connected to the compressor C. The compressor C may also be configured to exert a high pressure gas on the air amplifier 5. The air amplifier 5 may be used to accelerate the air in the discharge connection line 4. For example, the air amplifier 5 may accelerate the air in the discharge connection line 4 using the high pressure gas supplied from the compressor C. The air amplifier 5 may accelerate the air in the discharge connection line 4 by the Coandă effect using the high pressure gas supplied from the compressor C. Due to the acceleration by the air amplifier 5, the air may move in the discharge connection line 4. Accordingly, dust may also move in the discharge connection line 4. This will be described in more detail below.

The desiccant supplying part 7 may be connected to the supply connection line 2. The desiccant supplying part 7 may be configured to supply the desiccant to the supply connection line 2. The desiccant supplied by the desiccant supplying part 7 may be supplied into the desiccant tank T through the supply connection line 2.

The dust collector 9 may be connected to the discharge connection line 4. The dust collector 9 may be configured to collect the dust, which is discharged to the discharge connection line 4. In detail, the dust collector 9 may collect the dust, which is discharged to the discharge connection line 4 from the desiccant tank T.

The compressor C may be connected to the air connection line B, the supply connection line 2, and the discharge connection line 4. In detail, the compressor C may be selectively connected to the air connection line B, the supply connection line 2, and the discharge connection line 4. The compressor C may be configured to exert a high pressure gas on the air connection line B, the supply connection line 2, and the discharge connection line 4. This will be described in more detail below.

Figure 2:
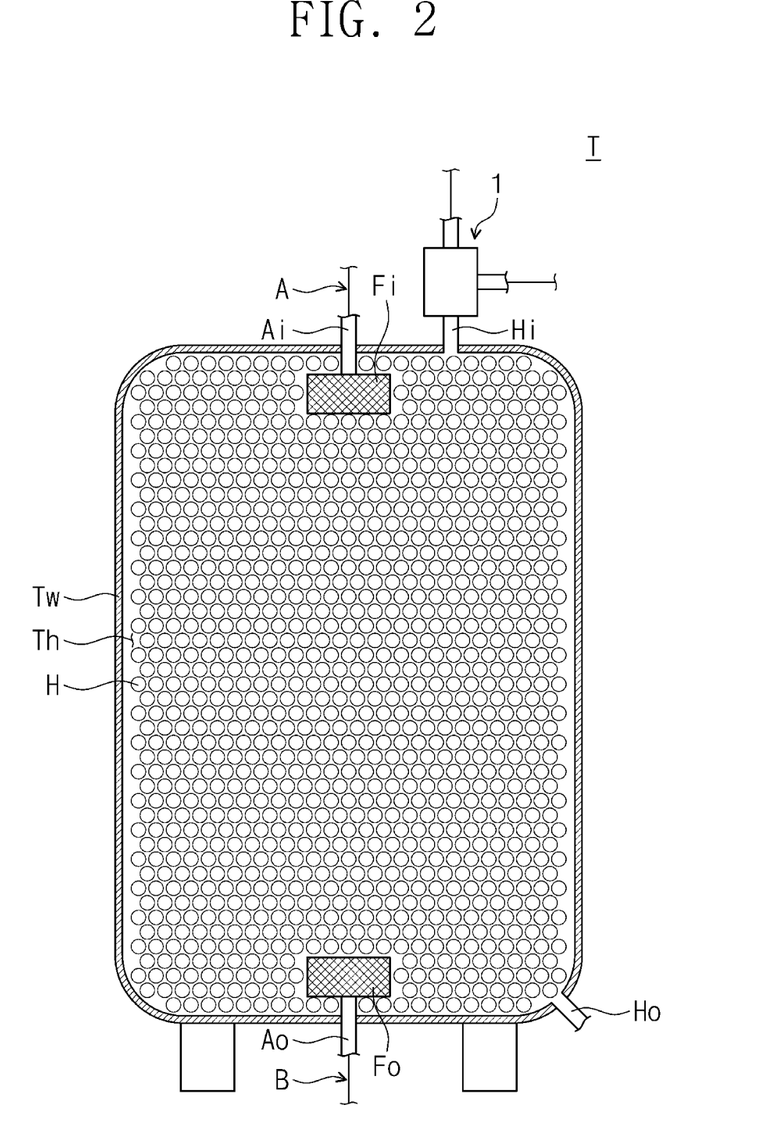
FIG. 2 is a sectional view illustrating a desiccant tank of an air dry system according to an embodiment of the inventive concept.

FIG. 2 is a sectional view illustrating a desiccant tank of an air dry system according to an embodiment of the inventive concept.

Referring to FIG. 2, the desiccant tank T may include a tank wall Tw defining a desiccant space Th. At least a portion of the desiccant space Th may be filled with a desiccant H. The desiccant H may include a moisture-absorbing material. For example, the desiccant H may include silica gel or the like. The desiccant H may lower the humidity of the air adjacent thereto. The desiccant H may have a finite lifetime. That is, the moisture absorption ability of the desiccant H may deteriorate after a certain period of time. Thus, after the certain period of time, it may be necessary to replace the desiccant H in the desiccant tank T with a new desiccant. In many cases, it is necessary to periodically perform the replacement operation of the desiccant H. For example, the replacement operation of the desiccant H should be carried out every five years. However, the inventive concept is not limited to this example, and the replacement period of the desiccant H may be variously changed, depending on details of designs and situations. The desiccant tank T may further include an air injection part or air injection port Ao, an air exhausting part or air exhaust part or air exhaust port Ai, a desiccant injection part or desiccant injection port Hi, and a desiccant exhausting part or desiccant exhaust part or desiccant exhaust port Ho.

The air injection part Ao may be connected to the desiccant space Th. In an embodiment, the air may be supplied into the desiccant space Th through the air injection part Ao. An injection filter Fo may be coupled to the air injection part Ao. The injection filter Fo may be configured to prevent the desiccant H from leaking through the air injection part Ao.

The air exhausting part Ai may be connected to the desiccant space Th. In an embodiment, the air may be exhausted from the desiccant space Th through the air exhausting part Ai. An exhaust filter Fi may be coupled to the air exhausting part Ai. The exhaust filter Fi may be configured to prevent the desiccant H from leaking through the air exhausting part Ai.

The desiccant injection part Hi may be connected to the desiccant space Th. The desiccant H may be supplied into the desiccant space Th through the desiccant injection part Hi. In an embodiment, the desiccant injection part Hi may be provided at or near a top portion of the desiccant tank T. However, the inventive concept is not limited to this example, and the position of the desiccant injection part Hi may be variously changed, if necessary.

The desiccant exhausting part Ho may be connected to the desiccant space Th. The desiccant H may be exhausted from the desiccant space Th through the desiccant exhausting part Ho. In an embodiment, the desiccant exhausting part Ho may be provided at or near a bottom portion of the desiccant tank T.

The air connection line B, the air exhaust line A, and the supply-discharge member 1 may be connected to the desiccant tank T.

The air connection line B may be connected to the air injection part Ao. The air may be supplied into the desiccant space Th through the air connection line B and the air injection part Ao. The air supplied through the air connection line B may contain air that has a relatively high humidity.

The air exhaust line A may be connected to the air exhausting part Ai. The air may be exhausted from the desiccant space Th through the air exhausting part Ai and the air exhaust line A. The air exhausted through the air exhaust line A may contain air that has a relatively low humidity. In other words, the high-humidity air, which is supplied into the desiccant tank T through the air connection line B, may be dehumidified by the desiccant H in the desiccant space Th and may be in a low-humidity state, when it is exhausted through the air exhaust line A.

The supply-discharge member 1 may be coupled to the desiccant injection part Hi. This will be described in more detail with reference to FIGS. 3 to 6.

Figure 3:
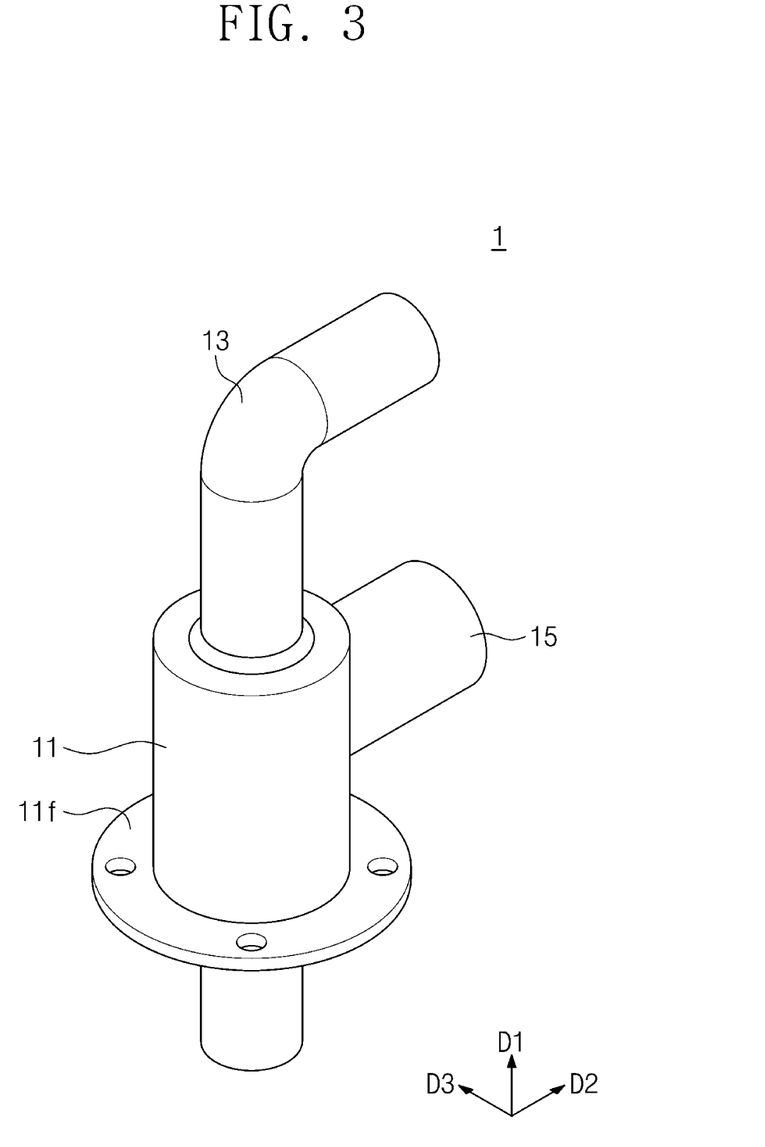
FIG. 3 is a perspective view illustrating a supply-discharge member of a desiccant replacing apparatus according to an embodiment of the inventive concept.

FIG. 3 is a perspective view illustrating a supply-discharge member of a desiccant replacing apparatus according to an embodiment of the inventive concept.

Referring to FIG. 3, the supply-discharge member 1 may include a housing 11, an injection line 13, and an exhaust line 15.

The housing 11 may include a flange 11f. The flange 11f may be positioned at a bottom portion of the housing 11. The supply-discharge member 1 may be coupled to the desiccant injection part Hi (e.g., see FIGS. 2 and 5) through the flange 11f.

The injection line 13 may be provided to penetrate or extend through the housing 11. The injection line 13 may penetrate the housing 11 in a first direction D1 and may extend to a region below the housing 11.

The exhaust line 15 may be connected to the housing 11. In an embodiment, the exhaust line 15 may extend in a second direction D2 and may be coupled to the housing 11.

Figure 4:
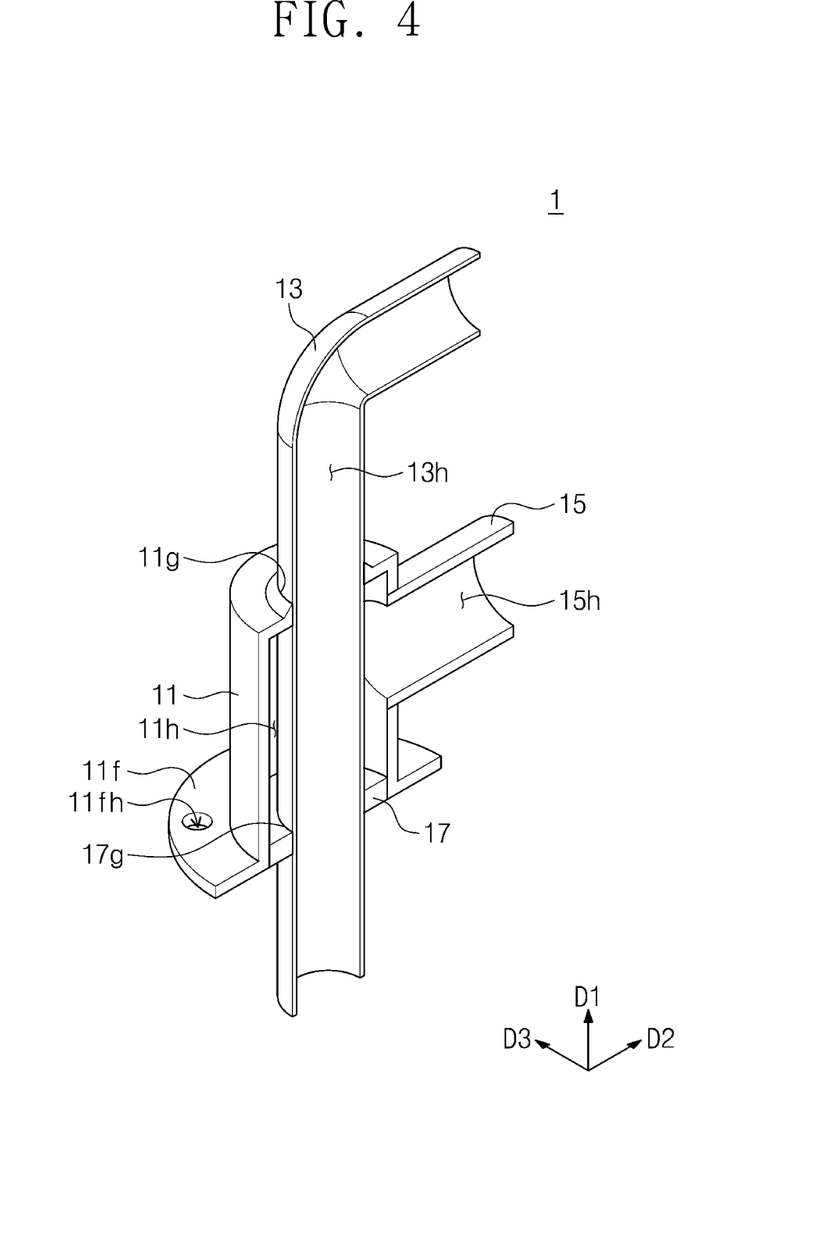
FIG. 4 is a perspective view illustrating a section of a supply-discharge member of a desiccant replacing apparatus according to an embodiment of the inventive concept.

FIG. 4 is a perspective view illustrating a section of a supply-discharge member of a desiccant replacing apparatus according to an embodiment of the inventive concept.

Referring to FIG. 4, the housing 11 may provide an internal space 11h. The internal space 11h may have a downwardly-open structure. In addition, the housing 11 may be provided to have an injection hole 11g. For example, the injection hole 11g may be formed in a top portion of the housing 11. The internal space 11h may be connected to a region, which is located on the housing 11, through the injection hole 11g. The internal space 11h may be defined by the housing 11 and the injection line 13. The internal space 11h may be annular and/or surround the injection line 13. The injection line 13 may be inserted into the injection hole 11g.

The flange 11f may provide a joint hole 11fh. The joint hole 11fh may extend vertically to penetrate the flange 11f. A joint member may be inserted into the joint hole 11fh to combine or connect the supply-discharge member 1 to another element. In an embodiment, a plurality of joint holes 11fh may be provided. However, in the following description, the joint hole 11fh will be referred to as a singular element, for brevity's sake.

The injection line 13 may be provided to pass through the injection hole 11*g* and the internal space 11*h* or to penetrate or extend through the housing 11 in the first direction D1. The injection line 13 may provide or define an injection path 13*h*.

The exhaust line 15 may provide or define an exhaust path 15*h*. The exhaust path 15*h* may be connected to the internal space 11*h*. The exhaust path 15*h* may extend in a direction different than the first direction D1. For example, the exhaust path 15*h* may extend in the second direction D2 (e.g., perpendicular to the first direction).

The supply-discharge member 1 may further include a filter 17. The filter 17 may be disposed in the internal space 11*h* of the housing 11 and/or the exhaust path 15*h* of the exhaust line 15. In the case where the filter 17 is disposed in the internal space 11*h* of the housing 11, the filter 17 may partially block a bottom portion of the internal space 11*h*. That is, the filter 17 may be located in the downwardly-open portion of the internal space 11*h*. The filter 17 may have a mesh structure, through which the air, but not the desiccant H (e.g., see FIG. 2), can pass. Due to this structure of the filter 17, only the air may flow from the internal space 11*h* to a region therebelow, but the flow of the desiccant H may be blocked. The filter 17 may include a penetration hole 17*g*. In an embodiment, the penetration hole 17*g* may be provided at a center of the filter 17. The penetration hole 17*g* may extend vertically. The injection line 13 may be inserted into the penetration hole 17*g*. The injection line 13 may be inserted into the injection hole 11*g*, the internal space 11*h*, and the penetration hole 17*g* and may extend in the first direction D1 to penetrate the housing 11 and the filter 17. Since the injection line 13 passes through the penetration hole 17*g* of the filter 17, a large-volume material may not be filtered by the filter 17 and may pass through the injection path 13*h*.

Figure 5:
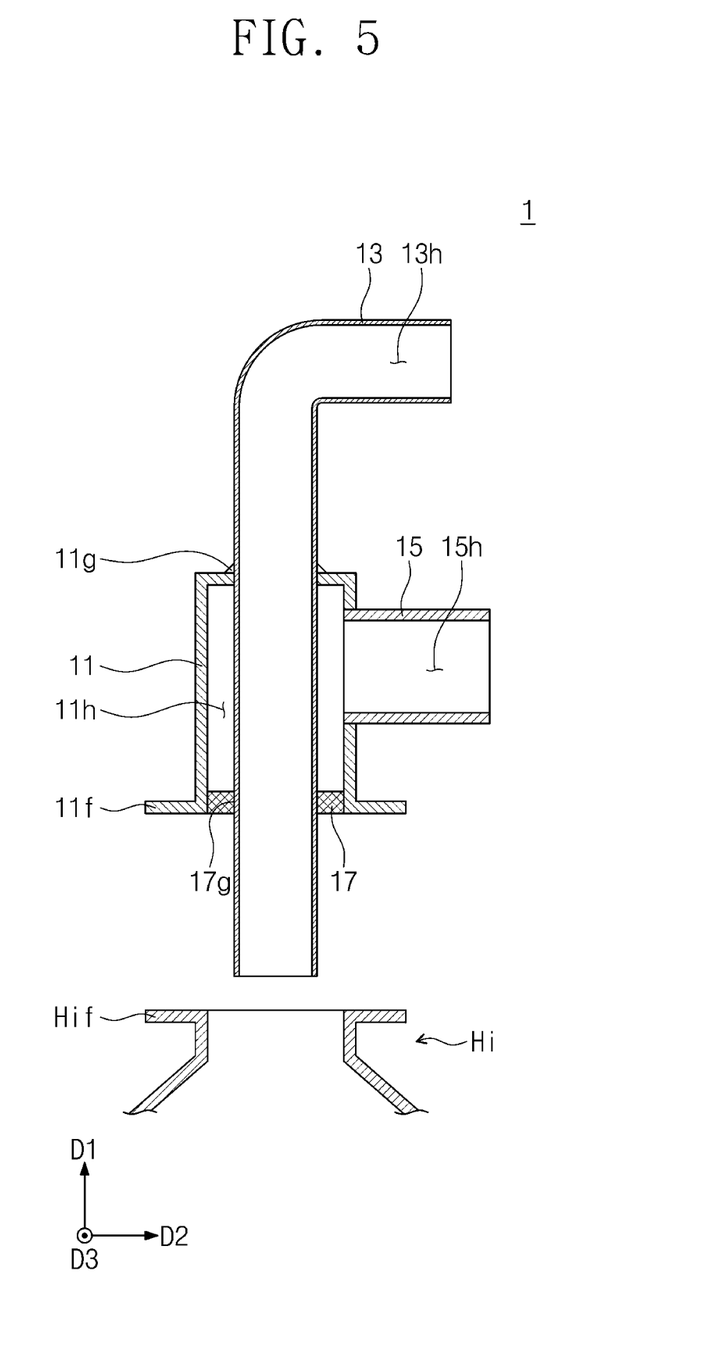
FIG. 5 is an exploded sectional view illustrating a supply-discharge member of a desiccant replacing apparatus according to an embodiment of the inventive concept.
Figure 6:
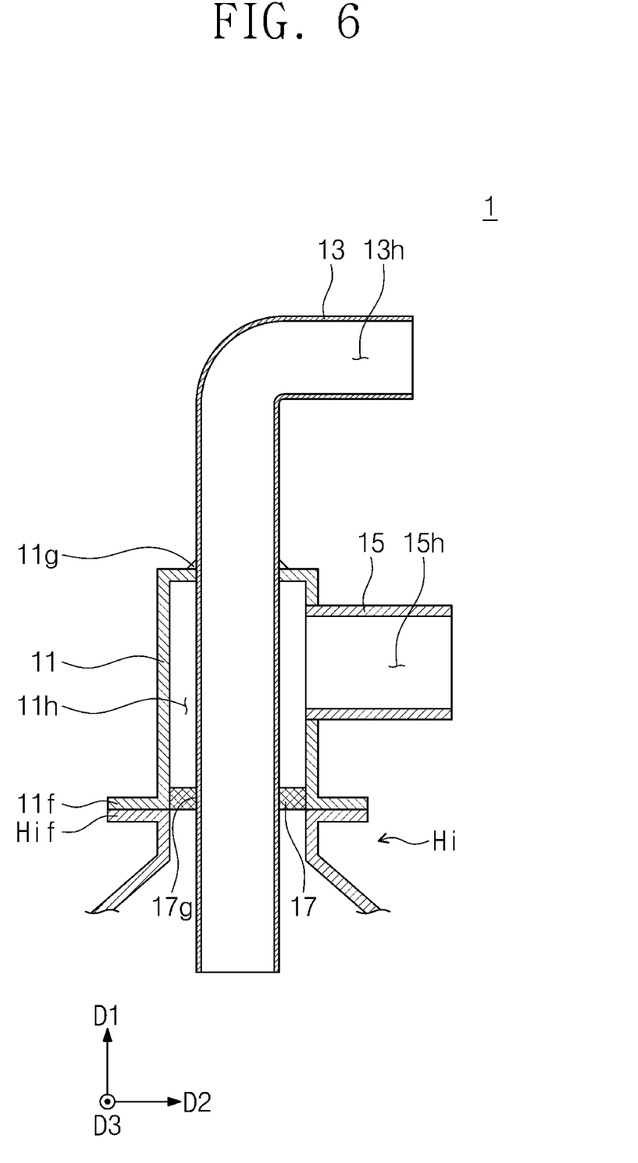
FIG. 6 is a sectional view illustrating a supply-discharge member of a desiccant replacing apparatus according to an embodiment of the inventive concept.

FIG. 5 is an exploded sectional view illustrating a supply-discharge member and a desiccant injection part of a desiccant tank, in a desiccant replacing apparatus according to an embodiment of the inventive concept, and FIG. 6 is a sectional view illustrating the desiccant replacing apparatus, in which the supply-discharge member and the desiccant injection part of the desiccant tank are coupled to each other, according to an embodiment of the inventive concept.

Referring to FIGS. 5 and 6, the supply-discharge member 1 may be coupled to the desiccant injection part Hi. The desiccant injection part Hi may be the same or substantially the same element as the desiccant injection part described with reference to FIG. 2. The desiccant injection part Hi may include an injection part flange Hif. The flange 11*f* of the supply-discharge member 1 may be coupled with the flange Hif of the desiccant injection part Hi. As a result of the coupling between the flanges, the supply-discharge member 1 and the desiccant injection part Hi may be robustly coupled to each other, and thus, it may be possible to prevent a crevice serving as a gas leakage path from being formed. Due to the coupling between the flange 11*f* of the supply-discharge member 1 and the flange Hif of the desiccant injection part Hi, the supply-discharge member 1 may be fixedly coupled to the desiccant tank T (e.g., see FIGS. 1 and 2).

Figure 7:
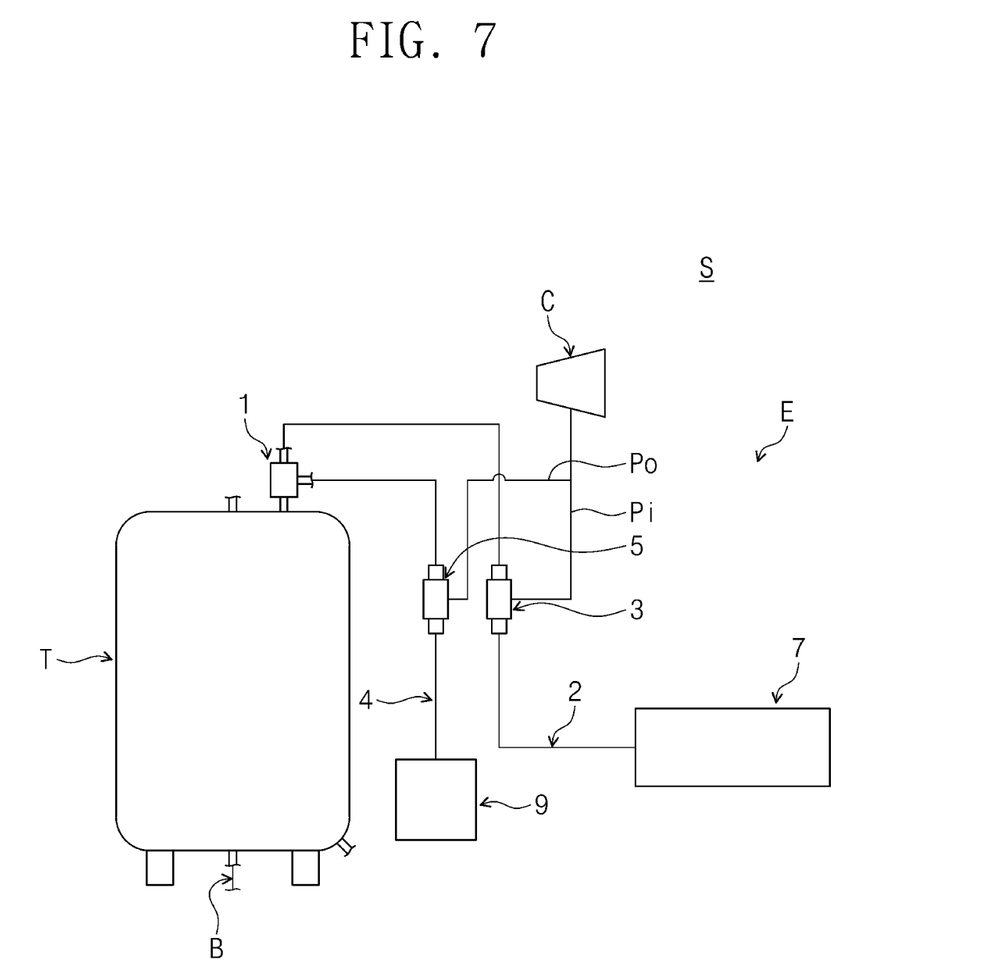
FIG. 7 is a schematic diagram illustrating an operation of replacing a desiccant of a desiccant tank, using a desiccant replacing apparatus according to an embodiment of the inventive concept.

FIG. 7 is a schematic diagram illustrating an operation of replacing a desiccant of a desiccant tank, using a desiccant replacing apparatus according to an embodiment of the inventive concept.

Referring to FIG. 7, the compressor C may be connected to the air conveyor 3 and/or the air amplifier 5. For example, the compressor C and the air conveyor 3 may be connected to each other through a first pressure exerting line or pipe Pi. In addition, the compressor C and the air amplifier 5 may be connected to each other through a second pressure exerting line or pipe Po.

During the drying operation of lowering the humidity of the air using the desiccant tank T, the compressor C may not be connected to the air conveyor 3 and/or the air amplifier 5. To terminate the drying operation of lowering the humidity of the air and to perform an operation of replacing the desiccant H (e.g., see FIG. 2) in the desiccant tank T, the compressor C may be connected to the air conveyor 3 and/or the air amplifier 5. That is, the compressor C may be connected to or disconnected from the air conveyor 3 and/or the air amplifier 5, when a need arises. However, the inventive concept is not limited to this example, and in an embodiment, an additional compressor for the air conveyor 3 and the air amplifier 5 may be provided. In this case, the compressor may be a part of the desiccant replacing apparatus E.

To replace the desiccant H (e.g., see FIG. 2) in the desiccant tank T, the air supplied into the desiccant tank T may be first interrupted. The existing desiccant H (e.g., see FIG. 2) may be removed from the desiccant tank T. For example, the desiccant exhausting part Ho (e.g., see FIG. 2) of the desiccant tank T may be opened to remove the desiccant H from the desiccant space Th. The desiccant H, which has become useless due to the moisture absorption, may be discharged from the desiccant tank T.

To supply the desiccant H into the desiccant tank T, the compressor C may provide compressed air to the air conveyor 3. In detail, the compressor C may provide the compressed air to the air conveyor 3 through the first pressure exerting pipe Pi. The air conveyor 3 may accelerate the air in the supply connection line 2 using the compressed air provided by the compressor C. The air in the supply connection line 2 may flow toward the supply-discharge member 1. As a result of the flow of the air in the supply connection line 2, the desiccant of the desiccant supplying part 7 may also move along with the air. The desiccant may be delivered toward the supply-discharge member 1 along the supply connection line 2.

The compressor C may provide compressed air to the air amplifier 5. In detail, the compressor C may provide the compressed air to the air amplifier 5 through the second pressure exerting pipe Po. The air amplifier 5 may accelerate the air in the discharge connection line 4 using the compressed air provided by the compressor C. The air in the discharge connection line 4 may be exhausted from the supply-discharge member 1. The air exhausted from the supply-discharge member 1 may flow toward the dust collector 9 along the discharge connection line 4.

In an embodiment, the compressor C may be disconnected from the desiccant tank T, while the desiccant H (e.g., see FIG. 2) is replaced by connecting the desiccant replacing apparatus E to the desiccant tank T. In detail, by disconnecting the air connection line B (e.g., see FIG. 2) from the desiccant tank T, the compressor C may be disconnected from the desiccant tank T. The supply of a to-be-dried air into the desiccant tank T through the air connection line B may be interrupted. However, the inventive concept is not limited to this example, and in an embodiment, the air connection line B may be coupled to the desiccant tank T, even during the desiccant replacement operation.

Figure 8:
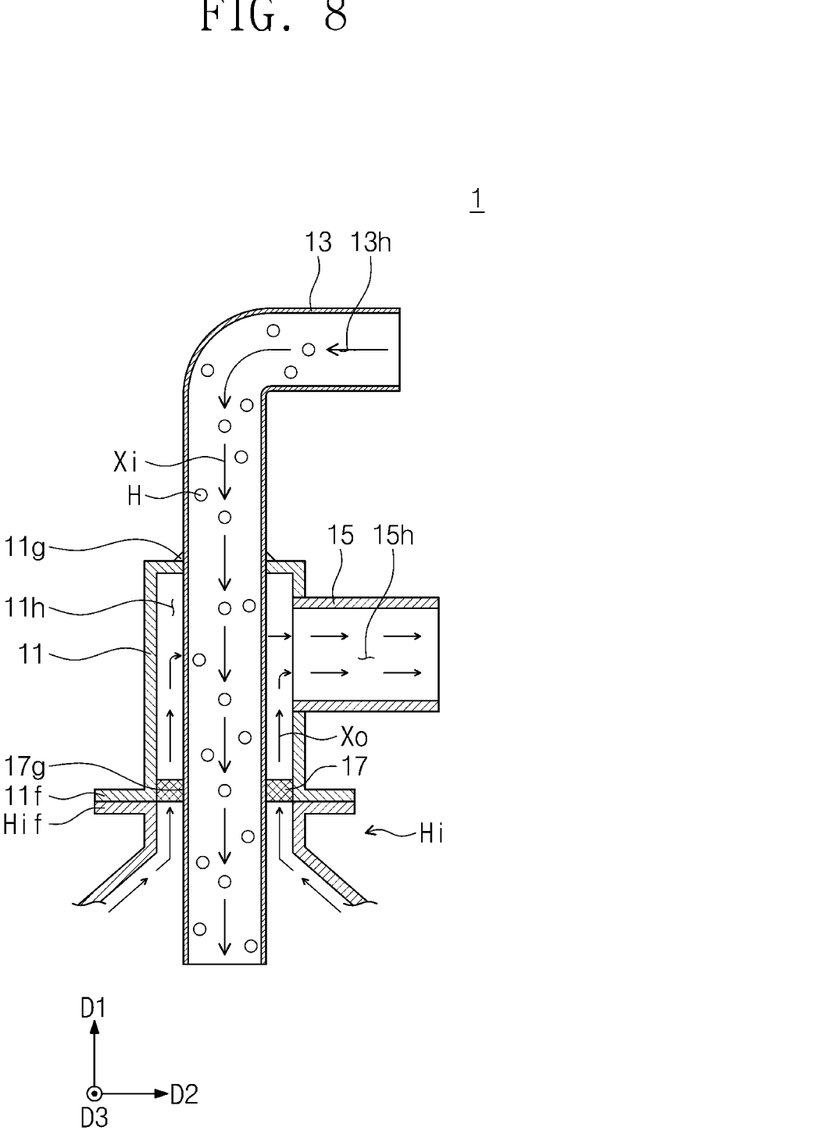
FIG. 8 is a sectional view illustrating an operation state of a supply-discharge member of a desiccant replacing apparatus according to an embodiment of the inventive concept.

FIG. 8 is a sectional view illustrating an operation state of a supply-discharge member of a desiccant replacing apparatus according to an embodiment of the inventive concept.

Referring to FIG. 8, air Xi, which is supplied through the supply connection line 2 (e.g., see FIG. 7), may pass through the injection line 13 and may be supplied into a region below the desiccant injection part Hi. That is, the air Xi may be injected into the desiccant tank T (e.g., see FIG. 7) through the desiccant injection part Hi. The air Xi, along with the desiccant H, which is supplied from the desiccant supplying part 7 (e.g., see FIG. 7) and is delivered therewith, may be supplied into the desiccant tank T.

Since the discharge connection line 4 (e.g., see FIG. 7) is configured to discharge the air in the supply-discharge member 1 to the outside, the air supplied into the desiccant tank T may be discharged again through the exhaust line 15. That is, air Xo may be discharged to the discharge connection line 4 through the filter 17, the internal space 11h, and the exhaust line 15. The desiccant H, which are delivered along with the air, may not pass through the filter 17, due to its large volume. Thus, only the desiccant H may be left in the desiccant tank T, and the air Xo may be exhausted to the outside. Since the air Xo is exhausted from the desiccant tank T to the outside, dust, which may be produced during the operation of supplying the desiccant H, may also be exhausted. The dust may be collected or trapped by the dust collector 9 (e.g., see FIG. 7).

In a desiccant replacing apparatus according to an embodiment of the inventive concept and an air dry system including the same, it may be possible to automatically supply a desiccant to a desiccant tank. This may make it possible to reduce the number of workers for a repetitive operation of replacing the desiccant. Accordingly, it is possible to reduce human resource and maintenance time.

In a desiccant replacing apparatus according to an embodiment of the inventive concept and an air dry system including the same, it may be possible to exhaust the air to the outside during the supplying of the desiccant. In addition, it may be possible to exhaust dust, which may be produced when the desiccant is supplied, to the outside, during the exhaust of the air. Thus, the dust in the desiccant tank may be reduced. Accordingly, when an air drying operation is restarted after the desiccant replacement operation, a clean (i.e., dust-free) dry air may be provided to a process chamber.

In a desiccant replacing apparatus according to an embodiment of the inventive concept and an air dry system including the same, a compressor, which is configured to perform an air drying operation or to supply the air to the desiccant tank, may be used to supply the desiccant into the desiccant tank. Thus, an additional external power device may not be needed. Accordingly, an overall structure of the apparatus may be simplified, and an operation cost may be reduced. In addition, a process of installing and maintaining the desiccant replacing apparatus may be simplified and facilitated.

Figure 9:
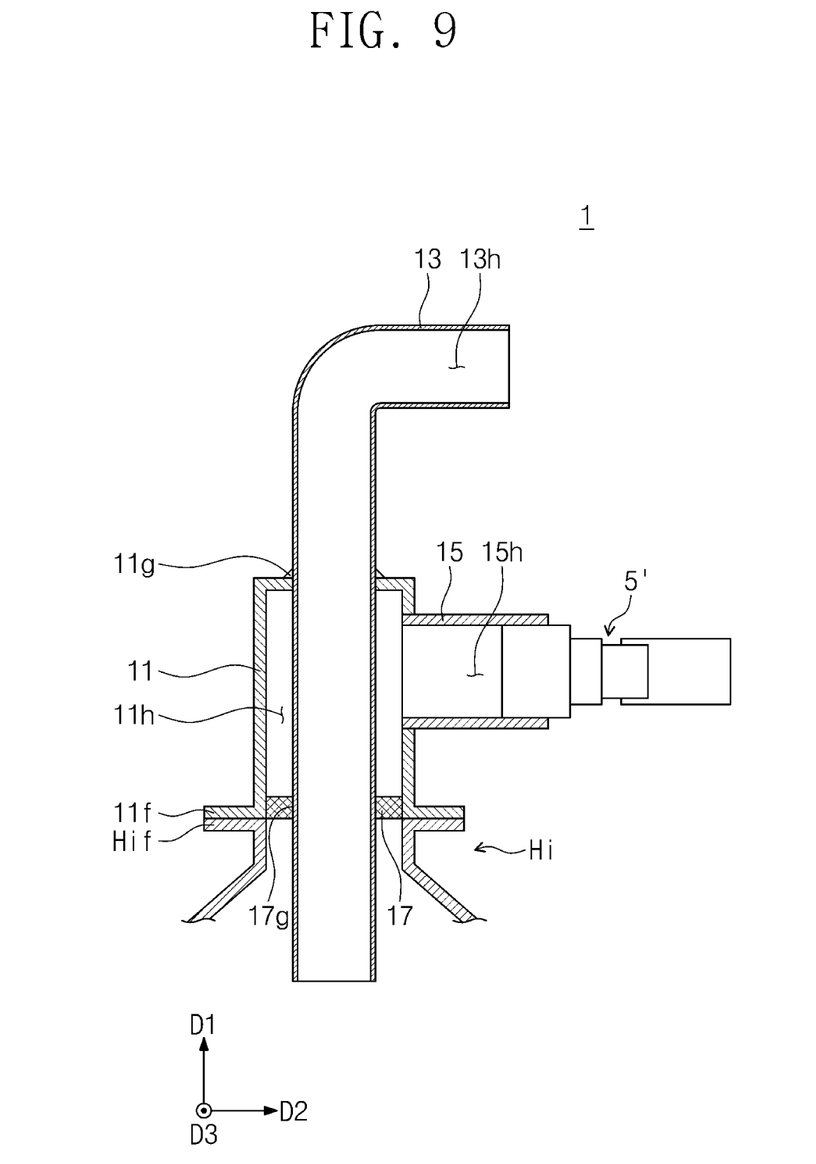
FIG. 9 is a sectional view illustrating a supply-discharge member of a desiccant replacing apparatus according to an embodiment of the inventive concept.

FIG. 9 is a sectional view illustrating a supply-discharge member of a desiccant replacing apparatus according to an embodiment of the inventive concept.

In the following description, an element previously described with reference to FIGS. 1 to 8 may be identified by the same reference number without repeating an overlapping description thereof, for the sake of brevity.

Referring to FIG. 9, an air amplifier 5' may be directly coupled to the exhaust line 15. For example, the air amplifier 5' may be directly coupled to the exhaust line 15, without any intervening element (e.g., the discharge connection line 4 of FIG. 1), unlike that described with reference to FIG. 1.

Figure 10:
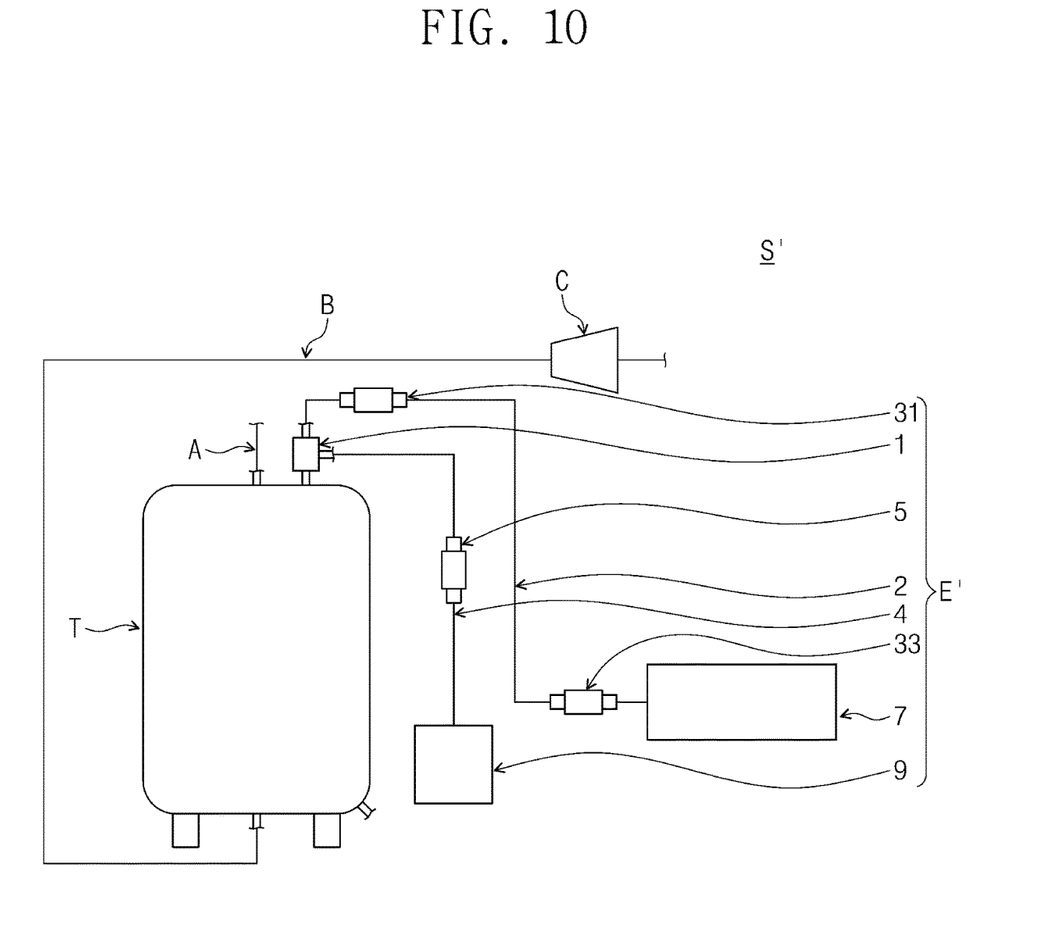
FIG. 10 is a schematic diagram illustrating a desiccant replacing apparatus according to an embodiment of the inventive concept and an air dry system including the same.

FIG. 10 is a schematic diagram illustrating a desiccant replacing apparatus according to an embodiment of the inventive concept and an air dry system including the same.

In the following description, an element previously described with reference to FIGS. 1 to 9 may be identified by the same reference number without repeating an overlapping description thereof, for the sake of brevity.

Referring to FIG. 10, an air dry system S' may include a plurality of air conveyors. For example, a plurality of air conveyors may be provided in series on the supply connection line 2. As an example, a first air conveyor 31 and a second air conveyor 33 may be provided on the supply connection line 2. When the desiccant supplying part 7 is far distant from the desiccant tank T or the desiccant tank T is placed at a high level, the plurality of air conveyors may be used to increase a force to transfer the desiccant.

Figure 11:
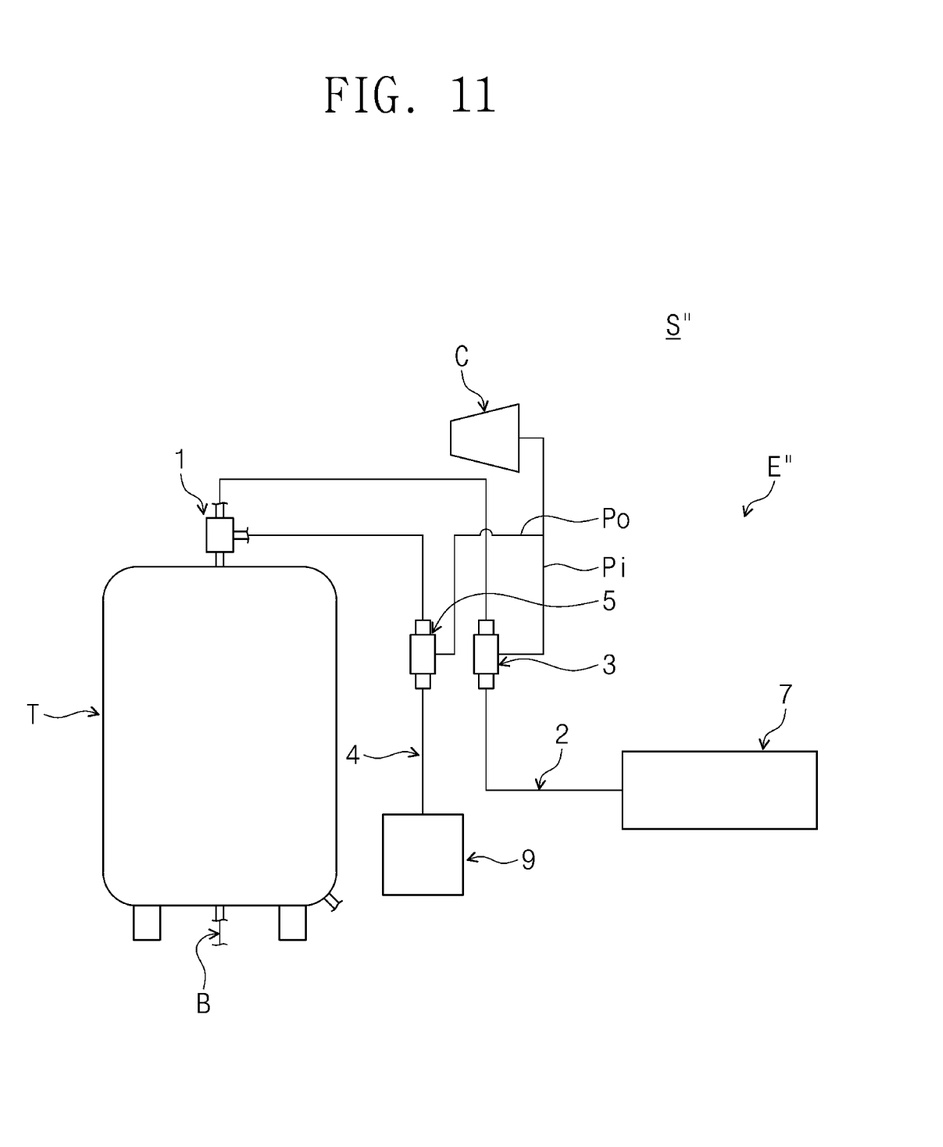
FIG. 11 is a schematic diagram illustrating a desiccant replacing apparatus according to an embodiment of the inventive concept and an air dry system including the same.

FIG. 11 is a schematic diagram illustrating a desiccant replacing apparatus according to an embodiment of the inventive concept and an air dry system including the same.

In the following description, an element previously described with reference to FIGS. 1 to 10 may be identified by the same reference number without repeating an overlapping description thereof, for the sake of brevity.

Referring to FIG. 11, the supply-discharge member 1 in an air dry system S'' may be coupled to the desiccant tank T at a portion, which is used to discharge the air. That is, the desiccant injection part Hi (e.g., see FIG. 2) may not be provided in the desiccant tank T, unlike that shown in FIG. 2. In this case, the supply-discharge member 1 may be directly coupled to the air exhausting part. For this, the air exhaust line A (e.g., see FIG. 1) coupled to the desiccant tank T may be omitted from the desiccant tank T.

Figure 12:
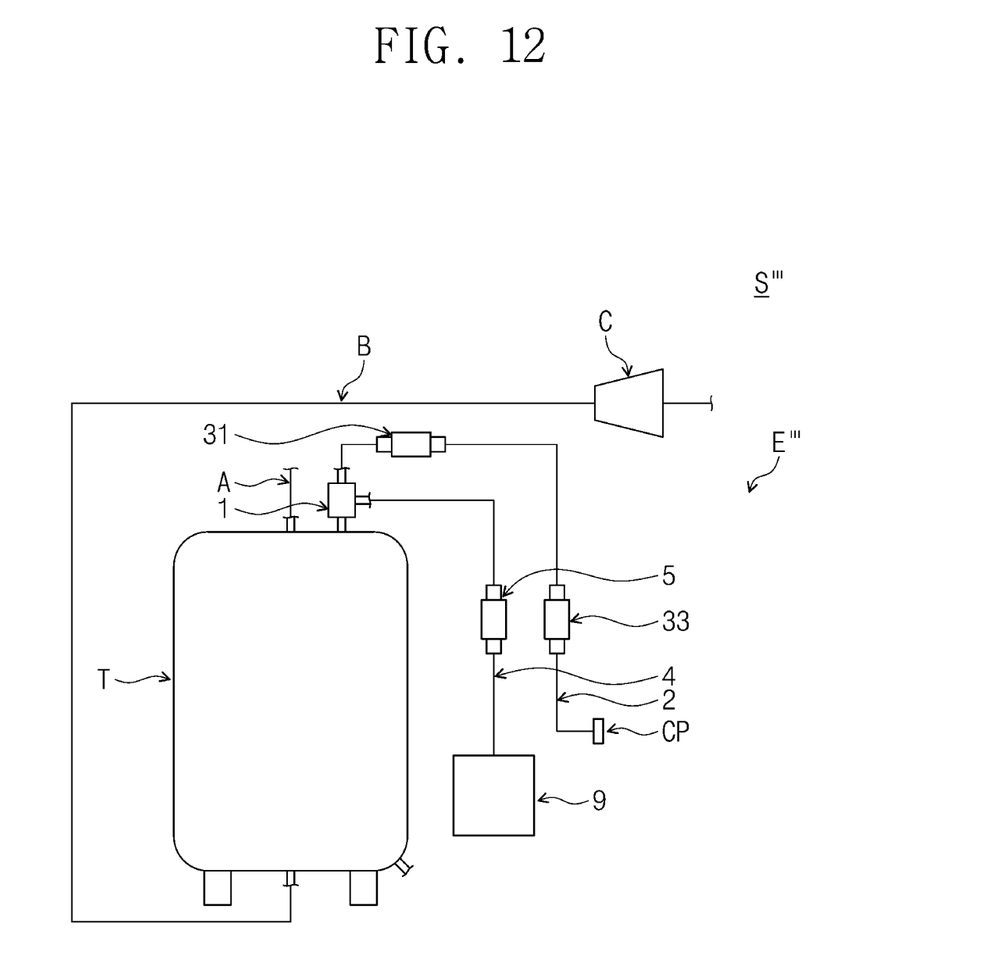
FIG. 12 is a schematic diagram illustrating a desiccant replacing apparatus according to an embodiment of the inventive concept and an air dry system including the same.

FIG. 12 is a schematic diagram illustrating a desiccant replacing apparatus according to an embodiment of the inventive concept and an air dry system including the same.

In the following description, an element previously described with reference to FIGS. 1 to 11 may be identified by the same reference number without repeating an overlapping description thereof, for the sake of brevity.

Referring to FIG. 12, a desiccant replacing apparatus E''' may include a coupling port CP. The coupling port CP may be connected to the supply connection line 2. An air dry system S''' of FIG. 12 may not include the desiccant supplying part 7, unlike that shown in FIG. 1. The coupling port CP connected to the supply connection line 2 may be an element that can be coupled to an external pipe or the like. An external pipe or the like, which is detachably coupled to the coupling port CP if necessary, may be used to supply a desiccant into the desiccant replacing apparatus E''' or to fill the desiccant tank T with the desiccant.

In a desiccant replacing apparatus according to an embodiment of the inventive concept and an air dry system including the same, it may be possible to automatically replace a desiccant.

In a desiccant replacing apparatus according to an embodiment of the inventive concept and an air dry system including the same, it may be possible to replace the desiccant, even when additional power is not provided.

In a desiccant replacing apparatus according to an embodiment of the inventive concept and an air dry system including the same, it may be possible to remove dust, during the replacement of the desiccant.

While example embodiments of the inventive concept have been particularly shown and described, it will be understood by one of ordinary skill in the art that variations in form and detail may be made therein without departing from the scope of the attached claims.

What is claimed is:

1. A desiccant replacing apparatus, comprising:
a supply-discharge member;
a supply connection line connected to the supply-discharge member;
an air conveyor coupled to the supply connection line;
a discharge connection line connected to the supply-discharge member; and
an air amplifier coupled to the discharge connection line,
wherein the supply-discharge member comprises:
    a housing providing an internal space;
    an injection line providing an injection path and extending through the housing;
    an exhaust line providing an exhaust path fluidly connected to the internal space; and
    a filter in the internal space or the exhaust path,
wherein the supply connection line is connected to the injection line, and
the discharge connection line is connected to the exhaust line.

2. The apparatus of claim 1, wherein the housing comprises an injection hole fluidly connected to the internal space, and
the injection line is received through the injection hole.

3. The apparatus of claim 1, wherein the injection line extends in a first direction to extend through the housing, and
the exhaust line extends in a second direction perpendicular to the first direction.

4. The apparatus of claim 1, wherein the filter is in the internal space,
the filter comprises a penetration hole, and
the injection line is received through the penetration hole.

5. The apparatus of claim 1, wherein the air conveyor comprises a plurality of air conveyors.

6. The apparatus of claim 1, further comprising a dust collector coupled to the discharge connection line.

7. The apparatus of claim 1, further comprising a compressor connected to the air conveyor or the air amplifier.

8. The apparatus of claim 1, further comprising a desiccant supplying part coupled to the supply connection line.

9. The apparatus of claim 1, further comprising a coupling port connected to the supply connection line.

10. The apparatus of claim 1, wherein the air amplifier is positioned between the discharge connection line and the exhaust line, and
the discharge connection line and the exhaust line are connected to each other via the air amplifier.

11. An air dry system, comprising:
a desiccant tank providing a desiccant space;
a desiccant replacing apparatus connected to the desiccant tank;
an air connection line coupled to the desiccant tank;
an air exhaust line coupled to the desiccant tank; and
a compressor connected to the air connection line,
wherein the desiccant tank comprises:
    an air injection part, to which the air connection line is coupled;
    an air exhausting part, to which the air exhaust line is coupled;
    a desiccant injection part, to which the desiccant replacing apparatus is coupled; and
    a desiccant exhausting part configured to exhaust a desiccant,
wherein the desiccant replacing apparatus comprises:
    a supply-discharge member;
    a supply connection line connected to the supply-discharge member;
    an air conveyor coupled to the supply connection line;
    a discharge connection line connected to the supply-discharge member; and
    an air amplifier coupled to the discharge connection line,
wherein the supply-discharge member comprises:
    a housing providing an internal space;
    an injection line providing an injection path and extending through the housing in a first direction;
    an exhaust line extending in a second direction different than the first direction and providing an exhaust path fluidly connected to the internal space; and
    a filter in the internal space,
wherein the housing is coupled to the desiccant injection part,
the supply connection line is connected to the injection line, and
the discharge connection line is connected to the exhaust line.

12. The system of claim 11, wherein the desiccant tank further comprises:
an injection filter coupled to the air injection part and in the desiccant space; and
an exhaust filter coupled to the air exhausting part and in the desiccant space.

13. The system of claim 11, wherein the compressor is configured to be selectively connected to the air conveyor or the air amplifier.

14. The system of claim 11, further comprising a desiccant supply coupled to the supply connection line.

15. The system of claim 11, further comprising a dust collector coupled to the discharge connection line.

16. The system of claim 11, wherein the filter comprises a penetration hole, and
the injection line is received through the penetration hole.

17. The system of claim 11, further comprising a coupling port connected to the supply connection line.

18. An air dry system, comprising:
a desiccant tank providing a desiccant space;
a desiccant replacing apparatus connected to the desiccant tank;
an air connection line coupled to the desiccant tank;
an air exhaust line coupled to the desiccant tank; and
a compressor connected to the air connection line,
wherein the desiccant tank comprises:
    an air injection part, to which the air connection line is coupled; and
    an air exhaust part, to which the air exhaust line is coupled,
wherein the desiccant replacing apparatus comprises:
    a supply-discharge member;
    a supply connection line connected to the supply-discharge member;
    an air conveyor coupled to the supply connection line;
    a discharge connection line connected to the supply-discharge member; and
    an air amplifier coupled to the discharge connection line,
wherein the supply-discharge member comprises:
    a housing providing an internal space;
    an injection line providing an injection path and penetrating the housing;

an exhaust line providing an exhaust path connected to the internal space; and a filter in the internal space or the exhaust path, wherein the supply connection line is connected to the injection line, and the discharge connection line is connected to the exhaust line.

19. The system of claim 18, wherein the housing is configured to be selectively coupled to the air exhaust part such that the desiccant replacing apparatus is connected to the desiccant tank.

20. The system of claim 18, further comprising:

a desiccant supplying part coupled to the supply connection line; and a dust collector coupled to the discharge connection line.

\* \* \* \* \*